United States Patent
Araki

(10) Patent No.: US 8,054,959 B2
(45) Date of Patent: Nov. 8, 2011

(54) TELEPHONE EXCHANGE APPARATUS AND INCOMING CALL TRANSFER CONTROL METHOD OF THE APPARATUS

(75) Inventor: Ryo Araki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 3 days.

(21) Appl. No.: 12/819,555

(22) Filed: Jun. 21, 2010

(65) Prior Publication Data

US 2010/0329436 A1 Dec. 30, 2010

(30) Foreign Application Priority Data

Jun. 30, 2009 (JP) ................. 2009-156270

(51) Int. Cl.
*H04M 1/00* (2006.01)
*H04M 3/42* (2006.01)
*H04M 3/00* (2006.01)
(52) U.S. Cl. ............... 379/165; 379/212.01; 379/265.01
(58) Field of Classification Search .................. 379/156, 379/157, 165, 207.15, 211.02, 212.01, 265.01, 379/265.02, 265.13, 266.07, 266.08
See application file for complete search history.

(56) References Cited

U.S. PATENT DOCUMENTS

| | | | | |
|---|---|---|---|---|
| 5,537,470 A | * | 7/1996 | Lee | 379/265.11 |
| 5,537,611 A | * | 7/1996 | Rajagopal et al. | 379/221.07 |
| 6,795,542 B1 | * | 9/2004 | St. Jean | 379/212.01 |
| 2005/0213742 A1 | * | 9/2005 | Fukuzawa | 379/265.02 |

FOREIGN PATENT DOCUMENTS

| | | |
|---|---|---|
| JP | 8-214072 | 8/1996 |
| JP | 11-027399 | 1/1999 |
| JP | 11-298516 | 10/1999 |
| JP | 2000-287236 | 10/2000 |
| JP | 2001-145136 | 5/2001 |
| JP | 2002-290504 | 10/2002 |
| JP | 2008-118511 | 5/2008 |
| JP | 2008-236284 | 10/2008 |

OTHER PUBLICATIONS

Japanese Patent Application No. 2009-156270; Notice of Reasons for Rejection; mailed Sep. 28, 2010 (English translation).

* cited by examiner

*Primary Examiner* — Quoc D Tran
(74) *Attorney, Agent, or Firm* — Blakely, Sokoloff, Taylor & Zafman LLP

(57) ABSTRACT

According to one embodiment, a telephone exchange apparatus includes a memory and a calculation module and a controller. The memory stores data associating a caller ID specifying a caller and a recipient ID specifying a transfer operation source with frequency of transfer for each of at least one of a telephone terminal and a group to be a transfer destination. The calculation module calculates a percent of transfer from frequency of transfer in a predetermined period and store the percent of transfer for each of the caller ID in the memory. The controller refers the memory based on the caller ID and the recipient ID included in an incoming call, and performs incoming call control to at least one of a telephone terminal and a group corresponding to a transfer destination including a percent of transfer which is larger than a predetermined value based on a reference result.

10 Claims, 5 Drawing Sheets

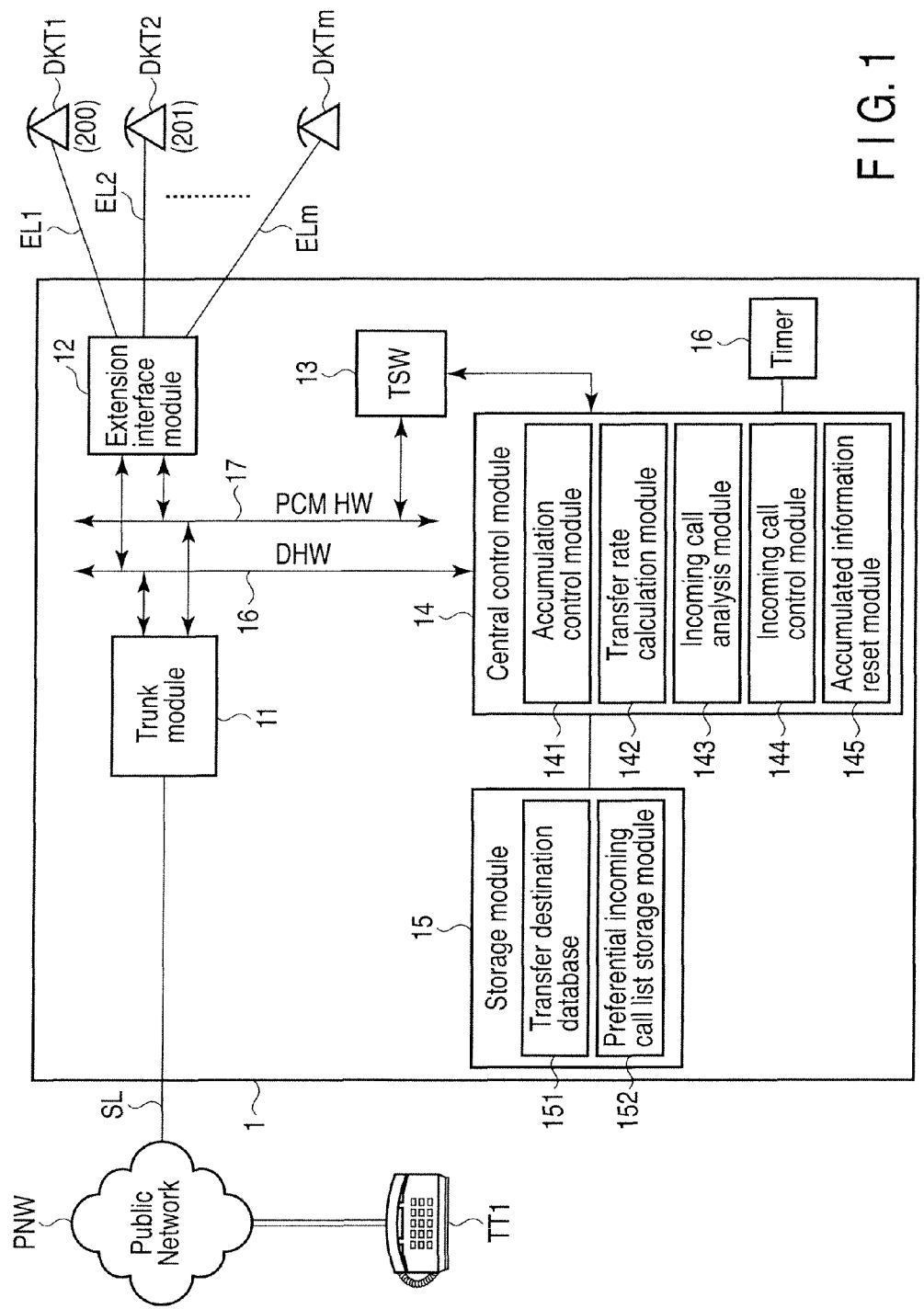
F I G. 1

| Caller number | Recipient number | Transfer destination number | Frequency (times) | Transfer rate [%] |
|---|---|---|---|---|
| 1234 | Sales department | 201 | 7 | 22 |
| 1234 | Sales department | 202 | 6 | 20 |
| 1234 | Design department | 202 | 10 | 32 |
| 1234 | Design department | 203 | 2 | 6 |
| ⋮ | | ⋮ | ⋮ | ⋮ |

FIG. 2

| Caller number | Recipient number | Preferential incoming call destination |
|---|---|---|
| 1234 | Sales department | 201, 202 |
| 1234 | Design department | 202 |
| 5678 | Design department | 300 |
| 9876 | — | — |
| ⋮ | | ⋮ |

| Caller number | Recipient number | Preferential incoming call destination |
|---|---|---|
| 1234 | Design department | 202, TG1 |

January, February, April, May, August, October, November

FIG. 9A

| Caller number | Recipient number | Preferential incoming call destination |
|---|---|---|
| 1234 | Sales department | 201, 202 |

March, June, July, September, December

FIG. 9B

| Caller number | Recipient number | Preferential incoming call destination |
|---|---|---|
| 1234 | Sales department | 401, 403 |

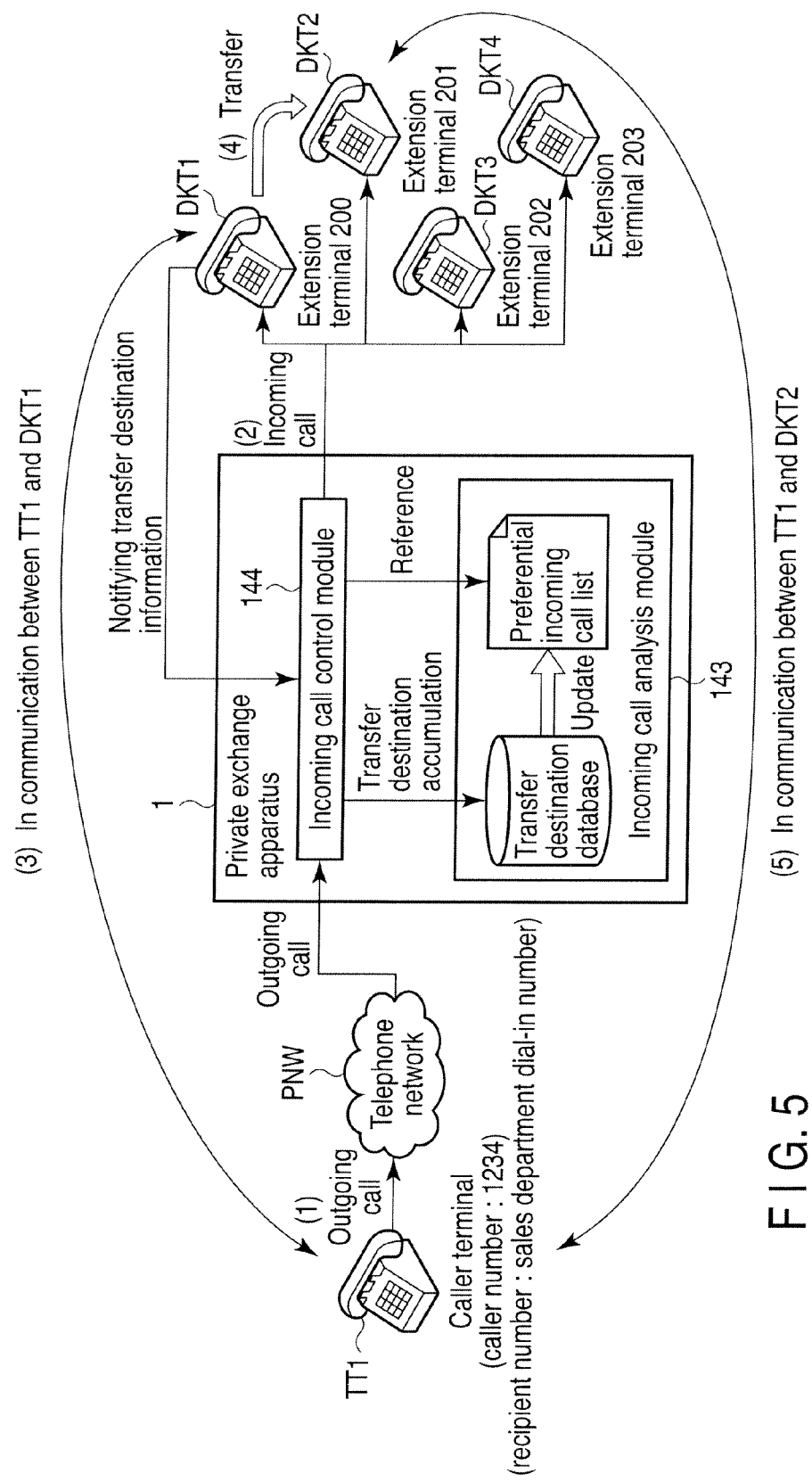
F I G. 5

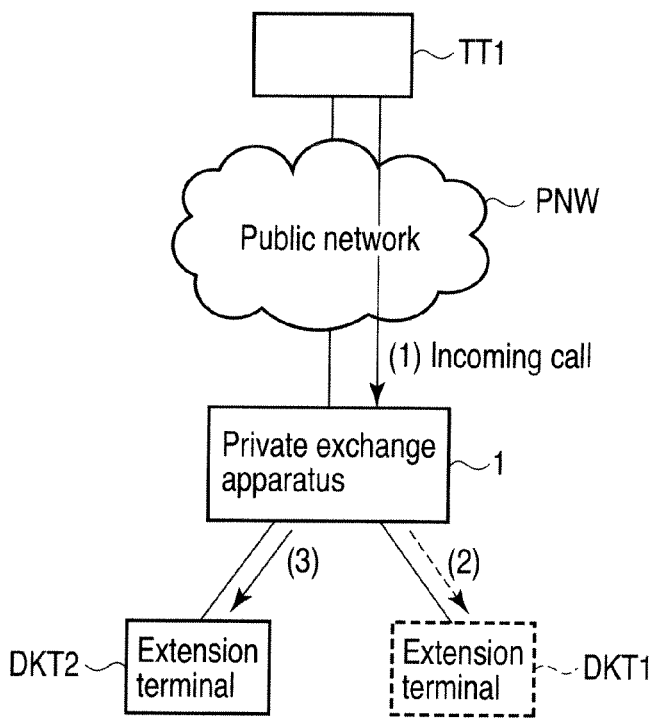
F I G. 6
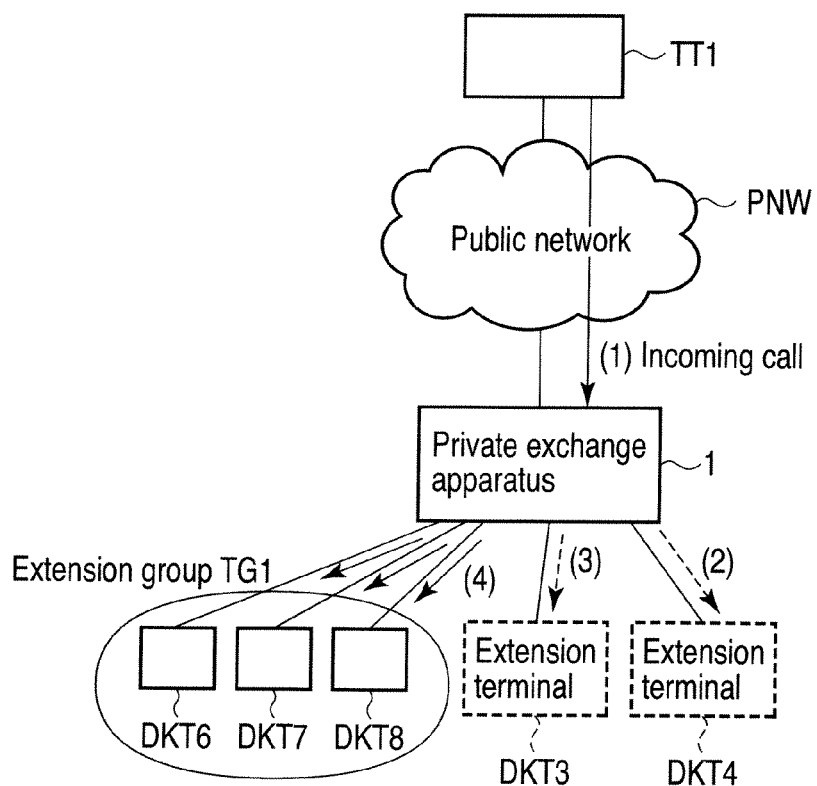
F I G. 7

TELEPHONE EXCHANGE APPARATUS AND INCOMING CALL TRANSFER CONTROL METHOD OF THE APPARATUS

CROSS-REFERENCE TO RELATED APPLICATIONS

This application is based upon and claims the benefit of priority from Japanese Patent Application No. 2009-156270, filed Jun. 30, 2009; the entire contents of which are incorporated herein by reference.

FIELD

Embodiments described herein relate generally to a telephone exchange apparatus equipped with various functions regarding exchange processing among a plurality of telephone terminals; and relates to an incoming call transfer control method of the telephone exchange apparatus.

BACKGROUND

The telephone exchange apparatus is equipped with various functions regarding exchange processing among a plurality of telephone terminals, and one of them is a group incoming call function. The group incoming call function is configured to simultaneously ring a plurality of extension terminals in a case, for example, where an trunk incoming call is terminated to an extension terminal belonging to a group registered in advance in an office.

Meanwhile, in the foregoing group incoming call function, in occasion, a dialed main number for the group simultaneously rings a plurality of extension terminals and make someone actually receive a telephone call. In this case, after calling the main number to talk some matters, and when the main number is dialed again before the talk of the matters have not completed, another person differing from the person who has been on the former telephone may receive the telephone. Then, such a trouble, in which the caller has to re-talk the matters, or the person who receives the incoming call asks whom the caller wants to receive the telephone call and makes the person who is wanted to be on the telephone receive the telephone, or has to transfer the incoming call to the desired extension terminal, is posed.

Conventionally, in a telephone response support apparatus, a method for storing incoming call history information including a caller information of previous incoming calls to a telephone terminal in a database, retrieves the incoming call history information corresponding to the caller information of the incoming calls, and deciding transfer destination candidates is disclosed (e.g., Jpn. Pat. Appln. KOKAI Publication No. 2008-118511).

BRIEF DESCRIPTION OF THE DRAWINGS

A general architecture that implements the various feature of the embodiments will now be described with reference to the drawings. The drawings and the associated descriptions are provided to illustrate the embodiments and not to limit the scope of the invention.

FIG. 1 is an exemplary block diagram depicting a configuration of an exchange system regarding a first embodiment;

FIG. 2 is an exemplary view depicting an example of storage content in a transfer destination database depicted in FIG. 1;

FIG. 3 is an exemplary view depicting an example of storage content in a preferential incoming call list storage module depicted in FIG. 1;

FIG. 5 is an exemplary view depicting an operation procedure when the preferential incoming call destination is registered in the first embodiment;

FIG. 6 is an exemplary view depicting an operation procedure when incoming call control is executed to the preferential incoming call destination in the first embodiment;

FIG. 7 is an exemplary sequence view depicting an operation performing incoming call transfer to an extension group in absence of an extension terminal of a preferential incoming call destination in a second embodiment;

FIG. 8 is an exemplary view depicting a registration example of a preferential incoming call list in the second embodiment;

FIG. 9A is an exemplary view depicting an example of preferential incoming call lists consisting of first data for each month as a third embodiment; and FIG. 9B is an exemplary view depicting an example of preferential incoming call lists consisting of second data for each month as the third embodiment.

DETAILED DESCRIPTION

Figure 4:
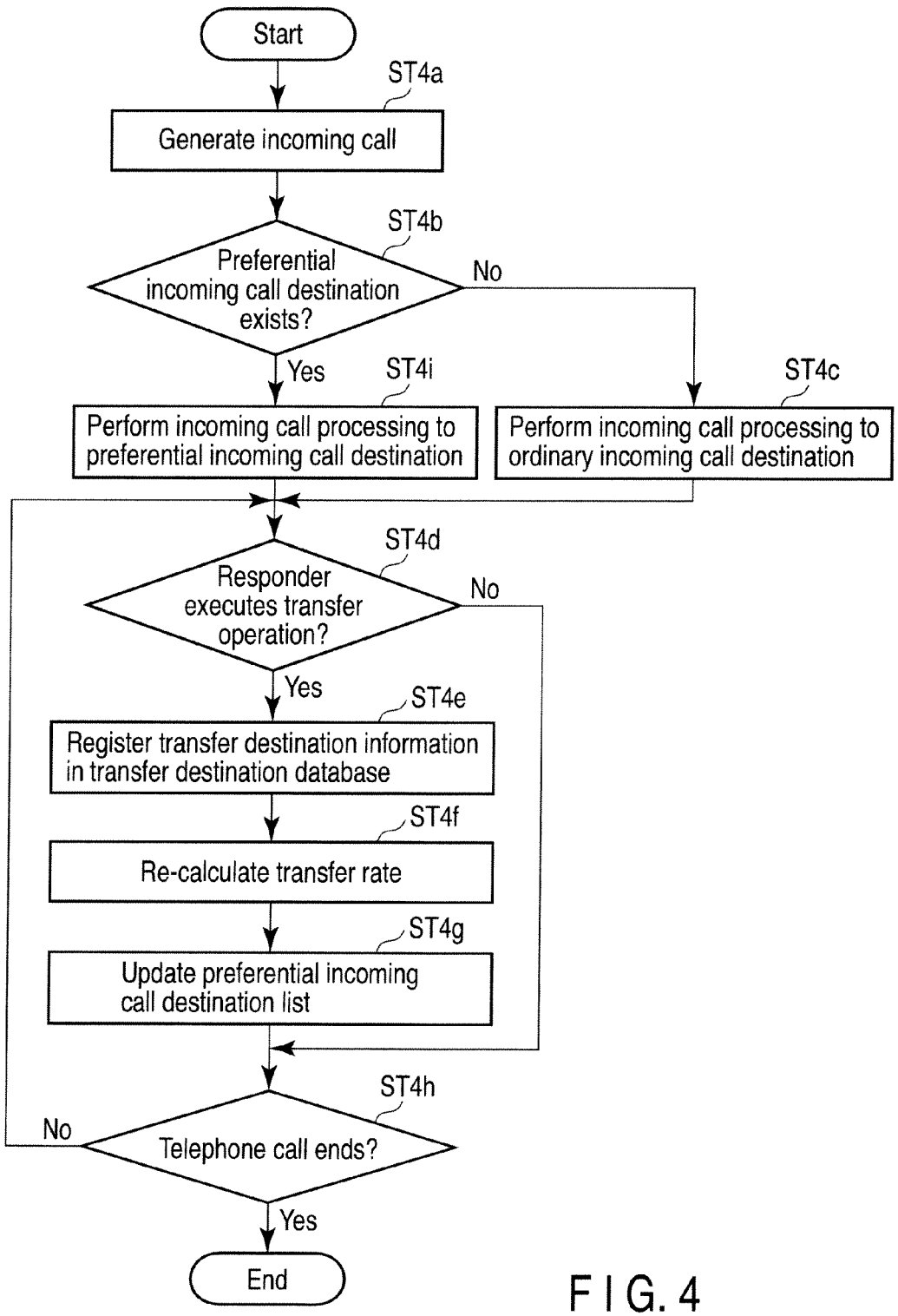
FIG. 4 is an exemplary flowchart depicting a control processing procedure of a central control module when incoming call control is executed to the preferential incoming call destination in the first embodiment.

Various embodiments will be described hereinafter with reference to the accompanying drawings.

In general, according to one embodiment, a telephone exchange apparatus which executes exchange processing among a plurality of telephone terminals, comprising: a memory configured to store data associating a caller ID and a recipient ID with frequency of transfer for each of at least one of a telephone terminal and a group to be a transfer destination, in response to a call transfer operation at a telephone terminal with call connection established another terminal, wherein the caller ID specifies a caller, the recipient ID specifies a transfer operation source; a calculation module configured to calculate a percent of transfer from frequency of transfer in a predetermined period and store the percent of transfer for each of the caller ID in the memory; and a controller configured to refer the memory based on the caller ID and the recipient ID included in an incoming call when the incoming call arrives, and perform incoming call control to at least one of a telephone terminal and a group corresponding to a transfer destination including a percent of transfer which is larger than a predetermined value based on a reference result of the memory.

FIRST EMBODIMENT

FIG. 1 shows a block diagram illustrating a configuration of an exchange system regarding a first embodiment and the reference number 1 designates a private exchange apparatus.

The exchange apparatus 1 comprises an trunk module 11, an extension interface module 12, a time switch (TSW) 13, a central control module 14, and a storage module 15. Among of them, the trunk module 11, the extension interface module 12 and the central control module 14 are mutually connected through a control bus (DHW) 16. The trunk module 11, the extension interface module 12 and the TSW 13 is mutually connected through a voice bus (PCMHW) 17.

The trunk module 11 is connected to a public network (PNW) via a subscriber line SL to perform establishment processing to and from the public network PNW.

A plurality of extensions EL1 to Elm (m is natural number) is accommodated in the extension interface module 12, extension terminals DKT1 to DKTm are connected to these extensions EL1 to Elm, respectively. For instance, digital key telephone sets are used as the extension terminals DKT1 to DKTm. The extension interface module 13 performs outgoing call/incoming call processing and transfer processing or the like of digital signals from and to the extension terminals DKT1 to DKTm.

The TSW 13 performs channel exchange of digital signals transmitted via the voice bus 17 between the trunk module 11 and the extension interface module 12.

The central control module 14 executes transmission processing accompanied by an outgoing call request of each extension terminal DKT1 to DKTm, ordinary incoming call processing accompanied by the outside incoming call from the subscriber line SL, and transfer processing or the like among the extension terminals DKT1 to DKTm.

In the storage module 15, control data which is necessary for control processing of the central control module 14 is stored.

Meanwhile, in the first embodiment, the central control module 14 is provided with an accumulation control module 141, a transfer rate calculation module 142, an incoming call analysis module 143, an incoming call control module 144, and an accumulated information reset module 145.

For instance, in a state where all connection between the external telephone terminal TT1 and an extension terminal DKT1 is established, in a case where a transfer operation to the extension terminal DKT2 is performed in the extension terminal DKT1, the accumulation control module 141 generates data, associating a telephone number as a terminal ID specifying the external telephone terminal TT1 to be a caller, an extension telephone number (200: sales department) of the extension terminal DKT1, an extension telephone number (201) of the extension terminal DKT2 to be an incoming call transfer destination for the extension terminal DKT1, and a frequency of transfers "one time" with one another, and accumulates the data in a transfer destination database 151 in the storage module 15. The frequency indicates number of times. The transfer rate calculation module 142 calculates a transfer rate, for example, from the frequency of transfers for each caller of one week and accumulates in the transfer destination database 151. The data shown in FIG. 2 is stored in the transfer destination database 151. The transfer rate indicates percent of transfer in one week.

The incoming call analysis module 143 selects associated data among caller numbers, incoming call numbers, and transfer destination numbers which is accumulated in the transfer destination database 151 and of which the transfer rate exceeds, for example, "10%", and creates the preferential incoming call list with the selected associated data collected therein to store the incoming call list in a preferential incoming call list storage module 152. The data shown in FIG. 3 is stored in the list storage module 152. In the incoming call list, there is a case in which a plurality of incoming call destinations are set like the preferential incoming call destination of a caller number 1234, and a case in which one incoming call destination is set like a caller number 5678. Further, like a caller number 9876, a case in which the preferential incoming call destination has not been decided yet may exist by the reason that a minimum incoming call number (e.g., 10 times) is not satisfied.

When an incoming call addressed to an extension terminal DKT4 (design department), the incoming call control module 144 refers to a preferential incoming call list storage module 152 based on the telephone number of the calling source included in the incoming call, and executes incoming call control to an extension terminal DKT3 to be the incoming call transfer destination when the calling source is the external telephone terminal TT1.

For instance, when April in the next year is clocked by a timer 16, the accumulated information reset module 145 initializes the information accumulated in the transfer destination database 15.

Next, operation of the system configured in the manner given above will be described.

FIG. 4 shows a flowchart illustrating a control processing procedure of a central control module 14 when incoming call control to the preferential incoming call destination is executed.

For instance, as shown in FIG. 5, it is assumed that the external telephone terminal TT1 (caller number 1234) makes a call specifying a sales department as an incoming call destination, and in response to this, an incoming call including an incoming call telephone number arrives at the private exchange apparatus 1 through the public network PNW ((1) in FIG. 5). In this case, the central control module 14 shifts from Block ST4a to Block ST4b, and there, extracts the caller telephone number and the incoming call telephone number from the incoming call signal, and determines the preferential incoming call destination, corresponding to this caller telephone number and the incoming call telephone number, from the preferential incoming call list stored in the incoming call list storage module 152.

Here, if the preferential incoming call destination, corresponding to the caller telephone number and the incoming call telephone number, has not been registered in the list storage module 152 (NO), the central control module 14 transmits incoming call data to the extension terminal DKT1 to be the incoming call destination to make the extension terminal DKT1 give incoming call notice (Block ST4c).

When the user of the extension terminal DKT1 responds to this incoming call notice, a communication link is established between the external telephone terminal TT1 and the extension terminal DKT1 ((3) in FIG. 5).

In this state, it is assumed that the user performs an incoming call transfer operation from the extension terminal DKT1 to the extension terminal DKT2. Then, the request signal is transmitted from the extension terminal DKT1 to the private exchange apparatus 1. While maintaining the communication link with the external telephone terminal TT1, the central control module 14 calls out the extension terminal DKT2 that is the transfer destination, then if the extension terminal DKT2 responds, opens the communication link with the extension terminal DKT1, and establishes a communication link between the external telephone terminal TT1 and the extension terminal DKT2 ((5) in FIG. 5). The central control module 14, then, shifts the state from Block ST4d to Block ST4e, and there, generates data, in which the telephone number (1234) of the external telephone terminal TT1, the extension telephone number (200: sales department) of the extension terminal DKT1, the extension telephone number (201) of the extension terminal DKT2 to be the incoming call transfer destination, and the frequency of transfer are associated with one another, to accumulate the data in the transfer destination database 151 of the storage module 15.

The central control module 14 then calculates a transfer rate of the association between the caller telephone number (1234) and the extension telephone number (200: sales department) (Block ST4f), if the calculated transfer rate exceeds, for example, "10%", registers the associated data among the caller telephone number (1234), the incoming call telephone number (sales department) and the transfer destination telephone number (201) in the preferential destination list (Block ST4g).

After this, the central control module 14 monitors whether or not the communication between the external telephone terminal TT1 and the extension terminal DKT2 ends (Block ST4b), and repeatedly executes Blocks ST4d to ST4h until a telephone call ends. When the communication ends, the central control module 14 completes the telephone call.

After, as shown in FIG. 6, it is assumed that the external telephone terminal TT1 makes a call specifying the sales department as the incoming call destination, and in response to this, the incoming call signal including the incoming call telephone number arrives to the private exchange apparatus 1 via the public network PNW ((1) in FIG. 6). In this case, the central control module 14 extracts the caller telephone number and the incoming call telephone number from the incoming call signal to determine the preferential incoming call destination corresponding to the caller telephone number and the incoming call telephone number from the preferential incoming call list stored in the preferential incoming call list storage module 152.

Here, since the preferential incoming call destination corresponding to the caller telephone number and the incoming call telephone number has been register (YES), the central control module 14 executes the preferential incoming call processing (Block ST4i). In this preferential incoming call processing, the central control module 14 transmits incoming call data to the extension terminal DKT2 of the incoming call transfer destination to make the extension terminal DKT2 give incoming call notice ((3) in FIG. 6).

Thus, it is not necessary to perform a redundant transfer operation to the user of the extension terminal DKT1, the caller can make user of the extension terminal DKT2 be a desired partner at one time, and can reduce a waiting time for transfer.

When the user of the extension terminal DKT2 is absence, and the user of the extension terminal DKT5 has made a response, the central control module 14 generates the data in which the telephone number (1234) of the external telephone terminal TT1, the extension telephone number (200: sales department) of the extension terminal DKT1, the extension telephone number of the extension terminal DKT5 and the frequency of transfers are associated with one another, and accumulates the associated data in the transfer destination database 151 in the storage module 15 by associating the data with a proxy response flag indicating the response by proxy. The associated data being associated with the proxy response flag may reduce the degree of priority in comparison with other items of the associated data and may register in the preferential incoming call list as a transfer destination candidate.

As mentioned above, in the foregoing first embodiment, in the state where a call connection between the external telephone terminal TT1 and the extension terminal DKT1, when the extension terminal DKT1 performs the transfer operation to the extension terminal DKT2, the central control module 14 generates the data, in which the extension telephone number of the extension terminal DKT1, the telephone number of the external telephone terminal TT1, the telephone number of the extension terminal DKT2 to be the incoming call transfer destination, the frequency of transfers, and the transfer rate are associated with one another, to accumulate the data in the transfer destination database 151. Based on the transfer destination database 151 with the associated data accumulated therein, namely, based on statistic information of the transfer operations by the user, the central control module 14 creates the preferential incoming call list in which the extension telephone number of the extension terminal DKT1 having a large transfer rate, the telephone number of the external telephone terminal TT1 and the telephone number of the extension terminal DKT2, refers to the preferential incoming call list based on the caller telephone number included in the incoming signal in a case of arrival of the incoming call to the extension terminal DKT1 again to determine whether or not the caller has been registered in the preferential incoming call list, and enables the incoming call arrive at the extension terminal DKT2 which has been registered in the preferential incoming call list in a case where the caller is the external telephone terminal TT1 which has been registered in the preferential incoming call list.

Accordingly, it is not necessary to perform the redundant transfer operation to the respondent; it is possible for the caller to enhance the possibility of connecting with a desired partner at one time, and it is possible to reduce the waiting time for the transfer. Continuation of the transfer of the incoming call of junk calls, such as invitations to a response counter (e.g., general administration department) allows the incoming calls from relevant callers to preferentially terminate to a correspond department, and allows reducing the labor and time to respond to the junk calls.

In the first embodiment, in a case where, for example, April of the next year is clocked by a timer 19, since an accumulated information reset module 145 initializing the information accumulated in the transfer destination database 15, in a case, for example, the extension number assigned to the user due to a seat change, the reset module 145 clears the information once, and can re-accumulate the information, thereby, the preferential incoming call control, which reflects the latest preferential incoming call list, can be performed.

SECOND EMBODIMENT

A second embodiment gives with priority, for example, to the extension terminal DKT3.

As the transfer destination, when registering an extension group TG1 as the next priority order in the preferential incoming call list, if incoming call to the extension terminal DKT3 given with priority to be the transfer destination, performs incoming call control to the extension group TG1 corresponding to the transfer destination.

FIG. 7 shows a sequence view illustrating operations performing incoming transfers to the extension group TG1 in a case of absence of the extension terminal DKT3 that is the preferential incoming call destination in the second embodiment.

It is assumed that the external telephone terminal TT1 makes a call to specify the design department as the incoming call destination, and in response to this, an incoming call including an incoming call telephone number arrives at the private exchange apparatus 1 from the public network PNW ((1) in FIG. 7). In this case, the central control module 14 extracts the caller telephone number and the incoming call telephone number from the incoming call signal to determine the preferential incoming call destination corresponding to the caller telephone number and the incoming call telephone number from the preferential incoming call list stored in the preferential incoming call list storage module 152.

Here, since the preferential incoming call destination corresponding to the caller telephone number and the incoming call telephone number has been registered, the central control module 14 executes the preferential incoming call processing. In the preferential incoming call processing, the central control module 14 makes the extension terminal DKT3 to be the incoming call transfer destination perform an incoming call notice by transmitting incoming call data to the extension terminal DKT3 ((3) in FIG. 7).

At this time, it is assumed that the extension terminal DKT3 to be the preferential incoming call destination is busy, or the extension terminal DKT3 does not make a response for a predetermined time period. The central control module 14 then successively determines whether or not other incoming call transfer destinations have been registered in the preferential incoming call list. As shown, for example, in FIG. 8, if the extension group TG1 consisting of extension terminals DKT6-DKT8 has been registered, the central control module 14 makes the extension group TG1 perform incoming call notices by transmitting incoming call data ((4) in FIG. 7). If a call-out system is set to the extension group TG1, the central control module 14 performs broadcast incoming call control or individual incoming call control to the extension terminals DKT6-DKT8 belonging to the extension group TG1 in response to the call-out system.

As described above, according to the second embodiment, for example, in a case of being busy of the preferential incoming call destination, or in a case of no response after the elapse of a fixed time period, it is impossible to make an incoming call to the extension terminal DKT3 to be the preferential incoming call destination, the exchange system also can automatically transfer the incoming call to the extension group TG1 to which other incoming calls registered in the preferential incoming call list to terminate the incoming call.

The exchange system also can preferentially terminate the incoming call from the next time to the extension terminal DKT7 in the extension group TG1 of which the percent of answer exceeds, for example, "10%".

THIRD EMBODIMENT

In a third embodiment, an exchange system collects in months the associated data to be accumulated in the transfer destination database 151 to switchover the preferential incoming call list for each month.

FIG. 9 shows an example of preferential incoming lists differing from one another for each month as the third embodiment.

The accumulation control module 141 generates data, for each month, in which the telephone number as the terminal ID specifying the external telephone terminal TT1 to be the caller, the extension telephone number (200; sales department) of the extension terminal DKT1, the incoming call transfer destination to the extension terminal DKT1, and the frequency transfers are associated with one another to accumulate the data in the transfer destination database 151 in the storage module 15.

The incoming call analysis module 143 selects the associated data of the caller number and the transfer destination number to be accumulated in the transfer destination database 151 for each month, and collects the selected associated data in months to store the data in the preferential incoming list storage module 152.

Now, it is assumed that two lists consisting of first data shown in FIG. 9A and second data shown in FIG. 9B are prepared.

In this state, the central control module 14 switchovers, for example, the preferential incoming call list stored in the preferential incoming call list storage module 15 from the second data to the first data, when January, February, April, May, August, October, November come, and switchovers the preferential incoming call list store in the preferential incoming call list storage 15 from the first data to the second data when March, June, July, September, December come. In this way, depending on the month, it is possible to automatically change the preferential incoming call destination corresponding to the call telephone number (1234) and the incoming call telephone number (sale department). It is possible for switching conditions of the data to use, for example, the days of the week, the time zones, other than the months.

As mentioned above, according to the third embodiment, the exchange system performs, for example, campaigning which is customary for each month in every month, if a person in charge of a correspondence counter changes in each campaigning, accumulating and collecting the information for every month enables deciding the preferential incoming call destination by using the information collected in the last year when the same month as that of one year future will come.

OTHER EMBODIMENTS

For instance, in the first embodiment, while the example, in which the transfer rate is calculated from the frequency of transfers for each caller to be set in the timer 16, for example, for one week, has been described, the embodiment is not limited by this example, and the transfer rate calculation period may be dynamically changed by system setting, etc. In this case, it is possible for the user to arbitrarily set the transfer rate calculation period, in a manner which sets the period to one day for a caller, at whom incoming calls arrive frequently, and sets the period to one month for a caller who has not made calls many times.

Other than this, also the kind and configuration of the private exchange apparatus, the kinds of the extension terminal, the registration procedure of the transfer destination data table, the creation control procedure of the preferential incoming call list, the control procedure of the preferential incoming call, or the like are performed in a various modified types without departing from the spirit and scope.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The various modules of the systems described herein can be implemented as software applications, hardware and/or software modules, or components on one or more computers, such as servers. While the various modules are illustrated separately, they may share some or all of the same underlying logic or code. The accompanying claims and their equivalents are intended to cover such forms or modifications as would fall within the scope and spirit of the inventions.

What is claimed is:

1. A telephone exchange apparatus which executes exchange processing among a plurality of telephone terminals, comprising:
a memory configured to store data associating a caller ID and a recipient ID with frequency of transfers for each of at least one of a telephone terminal and a group to be a transfer destination, in response to a call transfer operation at a telephone terminal with call connection established another terminal, wherein the caller ID specifies a caller, the recipient ID specifies a transfer operation source;

a calculation module configured to calculate a percent of transfer based on a associated data stored the memory and store the percent of transfer for each of the caller ID in the memory; and a controller configured to perform incoming call control to at least one of a telephone terminal and a group corresponding to a transfer destination including a percent of transfer which is larger than a predetermined value, when the telephone terminal and the group corresponding to the transfer destination is stored in the memory when the incoming call arrives, wherein the percent of transfer corresponds to caller ID and the recipient ID included in the incoming call.

2. The apparatus of claim 1, wherein the memory stores a transfer destination database accumulating data associating a caller ID and a recipient ID with frequency of transfer and percent of transfer for each of at least one of a telephone terminal and a group to be a transfer destination; and a preferential incoming call list storing at least one of the telephone terminal and the group for each of the caller ID and the recipient ID, wherein the telephone terminal and the group which the percent of transfer stored in the transfer destination database is larger than a predetermined value.

3. The apparatus of claim 1, wherein the controller performs incoming call control to at least one of a telephone terminal and a group corresponding to a transfer destination including the percent of transfer for the caller which is larger than a predetermined value, when the number of incoming calls from identical callers stored in the memory reaches the minimum number of incoming calls.

4. The apparatus of claim 1, further comprising:
a reset module configured to reset associated data stored in the memory based on predetermined conditions.

5. The apparatus of claim 1, wherein the controller makes a telephone terminal among the group receive the incoming call from the next time preferentially, wherein the telephone terminal includes a percent of answer which exceeds a predetermined value.

6. The apparatus of claim 1, wherein the memory stores an associated data associating a terminal ID specifying another telephone terminal different from the telephone terminal as the transfer destination and the group as the transfer destination, when a response operation is performed by another telephone terminal.

7. The apparatus of claim 1, wherein the controller gives top priority to the telephone terminal as the transfer destination, and gives next order of the top priority to the group as the transfer destination, and performs incoming call control to the group corresponding to the transfer destination, when it is impossible to perform incoming call control to the telephone terminal with the top priority to be the transfer destination.

8. The apparatus of claim 1, wherein the memory collects the associated data by using at least one unit among a day of week unit, a time zone unit, and a month unit, and
the controller selects to refer one item of the associated data among a plurality of items of associated data collected in the memory based on at least one of the day of week, the time zone and the month.

9. The apparatus of claim 1, wherein the calculation module dynamically changes a percent of transfer calculation period based on predetermined conditions.

10. An incoming call transfer control method for use in a telephone exchange apparatus which executes exchange processing among a plurality of telephone terminals, comprising:

storing data associating a caller ID specifying a caller and a recipient ID specifying a transfer operation source with frequency of transfer for each of at least one of a telephone terminal and a group to be a transfer destination, in a memory, in response to a call transfer operation at a telephone terminal with call connection established another terminal;

calculating a percent of transfer based on a associated data stored the memory and storing the percent of transfer for each of the caller ID in the memory; and performing incoming call control to at least one of a telephone terminal and a group corresponding to a transfer destination including a percent of transfer which is larger than a predetermined value, when the telephone terminal and the group corresponding to the transfer destination is stored in the memory when the incoming call arrives, wherein the percent of transfer corresponds to caller ID and the recipient ID included in the incoming call.

* * * * *